US007904055B2

(12) United States Patent
Lee et al.

(10) Patent No.: US 7,904,055 B2
(45) Date of Patent: Mar. 8, 2011

(54) COMMUNICATING MESSAGE IN MOBILE COMMUNICATION SYSTEM

(75) Inventors: Young Dae Lee, Gyeonggi-do (KR); Sung Duck Chun, Gyeonggi-do (KR); Myung Cheol Jung, Seoul (KR); Patrick Fischer, Bourg la Reine (FR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 550 days.

(21) Appl. No.: 11/466,357

(22) Filed: Aug. 22, 2006

(65) Prior Publication Data
US 2007/0047486 A1  Mar. 1, 2007

Related U.S. Application Data

(60) Provisional application No. 60/711,595, filed on Aug. 24, 2005, provisional application No. 60/771,305, filed on Feb. 7, 2006.

(30) Foreign Application Priority Data

Aug. 23, 2005  (KR) .................. 10-2005-0077515

(51) Int. Cl.
*H04M 1/66* (2006.01)
*H04B 7/212* (2006.01)
*H04W 4/00* (2009.01)
*H04W 72/00* (2009.01)
*H04J 3/06* (2006.01)

(52) U.S. Cl. ......... 455/411; 370/329; 370/322; 370/503; 455/450

(58) Field of Classification Search ............... 455/452.1, 455/450, 411, 414.1, 517, 525, 436, 442; 370/322, 503, 431, 329
See application file for complete search history.

(56) References Cited

U.S. PATENT DOCUMENTS

| 5,659,756 | A | 8/1997 | Hefferon et al. |
| 6,317,430 | B1 | 11/2001 | Knisely et al. |
| 6,330,448 | B1 | 12/2001 | Otsuka et al. |
| 6,597,668 | B1 | 7/2003 | Schafer et al. |
| 6,795,412 | B1 * | 9/2004 | Lee ............................ 370/329 |
| 7,426,175 | B2 | 9/2008 | Zhuang et al. |
| 7,496,113 | B2 | 2/2009 | Cai et al. |

(Continued)

FOREIGN PATENT DOCUMENTS
DE  10337828 A1 * 4/2005

(Continued)

OTHER PUBLICATIONS

Huawei, "Further considerations on multiplexing method of shared Control Channel in Uplink Sing-Carrier FDMA" TSG-RAN WG1 #43, Nov. 7-11, 2005.

(Continued)

*Primary Examiner* — Nick Corsaro
*Assistant Examiner* — Manpreet S Matharu
(74) *Attorney, Agent, or Firm* — Lee, Hong, Degerman, Kang & Waimey

(57) ABSTRACT

The present invention relates to communicating a message in a mobile communication system. Preferably, the present invention comprises requesting radio resources for transmitting at least one message, receiving a response to the request for radio resources, transmitting a first message for requesting a first layer connection to a first node, and transmitting a second message for requesting a second layer connection with a second node prior to establishing the first layer connection.

7 Claims, 13 Drawing Sheets

U.S. PATENT DOCUMENTS

| | | |
|---|---|---|
| 2001/0024956 A1 | 9/2001 | You et al. |
| 2002/0009129 A1 | 1/2002 | Choi et al. |
| 2002/0021714 A1 | 2/2002 | Seguin |
| 2002/0066011 A1 | 5/2002 | Vialen |
| 2002/0071480 A1 | 6/2002 | Marjelund et al. |
| 2002/0160744 A1 | 10/2002 | Choi et al. |
| 2003/0076812 A1 | 4/2003 | Benedittis |
| 2003/0156624 A1 | 8/2003 | Koslar |
| 2003/0236085 A1* | 12/2003 | Ho .................... 455/411 |
| 2004/0008658 A1 | 1/2004 | Dahlman et al. |
| 2004/0014452 A1 | 1/2004 | Lim et al. |
| 2004/0077357 A1* | 4/2004 | Nakada .................... 455/452.1 |
| 2004/0157602 A1 | 8/2004 | Khawand |
| 2004/0198369 A1 | 10/2004 | Kwak et al. |
| 2004/0208160 A1* | 10/2004 | Petrovic et al. .................... 370/350 |
| 2005/0185608 A1 | 8/2005 | Lee et al. |
| 2005/0190728 A1* | 9/2005 | Han et al. .................... 370/335 |
| 2005/0271025 A1 | 12/2005 | Guethaus et al. |
| 2005/0288026 A1 | 12/2005 | Byun et al. |
| 2006/0025079 A1 | 2/2006 | Sutskover et al. |
| 2007/0140115 A1* | 6/2007 | Bienas et al. .................... 370/230 |
| 2007/0206531 A1 | 9/2007 | Pajukoski et al. |
| 2008/0095105 A1* | 4/2008 | Sundberg et al. .................... 370/329 |

FOREIGN PATENT DOCUMENTS

| | | |
|---|---|---|
| EP | 1009184 | 6/2000 |
| EP | 1261222 | 11/2002 |
| EP | 1361514 A1 | 11/2003 |
| EP | 1496639 | 1/2005 |
| EP | 1557968 | 7/2005 |
| EP | 1599063 | 11/2005 |
| EP | 1605724 | 12/2005 |
| EP | 1655863 | 5/2006 |
| EP | 1684538 | 7/2006 |
| JP | 2001-251380 | 9/2001 |
| KR | 10-2001-0111634 | 12/2001 |
| KR | 10-2001-0111637 | 12/2001 |
| KR | 10-2004-0048675 | 6/2004 |
| KR | 10-2004-0064867 | 7/2004 |
| KR | 10-2004-0089937 | 10/2004 |
| RU | 2168278 | 5/2001 |
| RU | 2219663 | 12/2003 |
| WO | 99/44383 | 9/1999 |
| WO | 99/60729 | 11/1999 |
| WO | 99/63713 | 12/1999 |
| WO | 02/03720 | 1/2002 |
| WO | 02/39760 | 5/2002 |
| WO | 02/45453 | 6/2002 |
| WO | 02/47417 | 6/2002 |
| WO | 02/075442 | 9/2002 |
| WO | 03/007636 | 1/2003 |
| WO | WO 03/017691 A2 | 2/2003 |
| WO | WO 03/043259 A1 | 5/2003 |
| WO | 03/056723 | 7/2003 |
| WO | 2004019558 | 3/2004 |
| WO | 2004/034656 | 4/2004 |
| WO | 2004045234 | 5/2004 |
| WO | WO 2004/075442 A2 | 9/2004 |
| WO | 2005055472 | 6/2005 |
| WO | 2005/074312 | 8/2005 |
| WO | 2005/088886 | 9/2005 |
| WO | 2005/099125 | 10/2005 |

OTHER PUBLICATIONS

NTT Docomo et al., "Multiplexing method of shraed control channel in uplink single-carrier FDMA radio access", TSG-RAN WG1 #42bis, Oct. 10-14, 2005.

Philips, "Evolved paging indicators for LTE", 3GPP TSG-RAN WG2 Meeting #49, Nov. 7-11, 2005.

NTT Docomo et al., "Paging channel structure for E-UTRA downlink", 3GPP TSG-RAN WG1 LTE ad hoc meeting, Jan. 23-25, 2006.

Motorola, "Paging channel design for E-UTRA", 3GPP TSG RAN1 LTE AdHoc, Jun. 27-30, 2006.

Sarkar, S. et al., "Common-channel soft handoff in cdma2000. The paging channel", IEEE transactions on Microwave theory and techniques, Jun. 2000.

Ericsson: "E-UTRA Random Access", 3GPP TSG-RAN WG1, R1-051445 [online], Nov. 7, 2005, XP003020958.

LG Electronics, Inc.: "Framing in the MAC Entity", 3GPP TSG-RAN WG2, R2-061012 [on-line], Mar. 27, 2006; Retrieved from the internet.

LG Electronics, Inc.: "HARQ and ARQ Operation", 3GPP TSG-RAN WG2, R2-060106 Jan. 9, 2006; Retrieved from the internet.

Zdarsky, F.A., et al.,"Handover in Mobile Communication Networks: Who Is In Control Anyway?", Proceedings of the 30th Annual EUROMICRO Conference, Aug. 31, 2004, XP10723593.

Derryberry, R.T., et al., "On CDMA 2000 Evolution—Reverse High-Speed Packet Data Physical Layer Enhancements In CDMA 2000 1xEV-DV," IEEE Communications Magazine, vol. 43, Issue 4, pp. 41-47, XP001228792, Apr. 18, 2005.

Chung, J., et al., "Packet Synchronization and Identification for Incremental Redundancy Transmission in FH-CDMA Systems," 3rd IEEE International Symposium on Personal, Indoor and Mobile Radio Communications, pp. 292-295, XP010107082, Oct. 19, 1992.

Smith, C., et al., "Establishment of a UMTS Speech Call, " 3G Wireless Networks, pp. 267-269, 2002, XP-002602558.

3rd Generation Partnership Project (3GPP), "3rd Generation Partnership Project; Technical Specification Group Radio Access Network; Radio Resource Control (RRC); Protocol Specification (Release 6)," Technical Specification, 3GPP TS 25.331, V6.6.0, Jun. 2005, XP-050367983.

3rd Generation Partnership Project (3GPP), "Technical Specification Group Radio Access Network; Radio Resource Control (RRC); Protocol Specification (Release 6), " Technical Specification, 3GPP TS 25.331 V6.6.0, pp. 72-82 and pp. 90-93, Jun. 2005.

* cited by examiner

COMMUNICATING MESSAGE IN MOBILE COMMUNICATION SYSTEM

CROSS-REFERENCE TO RELATED APPLICATIONS

Pursuant to 35 U.S.C. §119, this application claims the benefit of earlier filing date and right of priority to Korean Application No. P2005-0077515, filed on Aug. 23, 2005, U.S. Provisional Application No. 60/711,595, filed on Aug. 24, 2005, and U.S. Provisional Application No. 60/771,305, filed on Feb. 7, 2006, the contents of which are hereby incorporated by reference herein in their entirety.

FIELD OF THE INVENTION

The present invention relates to a wireless mobile communication system, and more particularly, to a method for communicating a message in the wireless mobile communication system.

BACKGROUND OF THE INVENTION

FIG. 1 is a block diagram of a network structure of a universal mobile telecommunications system (UMTS). Referring to FIG. 1, the UMTS mainly includes a user equipment (UE), a UMTS terrestrial radio access network (UTRAN), and a core network (CN).

The UTRAN includes at least one radio network sub-system (RNS). The RNS includes one radio network controller (RNC) and at least one base station (Node B) managed by the RNC. At least one or more cells exist in one Node B.

FIG. 2 is an architectural diagram of a radio interface protocol between the UE and the UTRAN based on a 3GPP radio access network standard. Referring to FIG. 2, a radio interface protocol vertically includes a physical layer, a data link layer and a network layer. Horizontally the radio interface protocol includes a user plane for data information transfer and a control plane for signaling transfer. The protocol layers in FIG. 2 can be divided into a first layer (L1), a second layer (L2) and a third layer (L3) based on three lower layers of an open system interconnection (OSI) standard model widely known in the art of communication systems.

The respective layers in FIG. 2 are explained as follows. First, the physical layer (PHY) as the first layer offers an information transfer service to an upper layer using a physical channel. A medium access control (MAC) layer is located above the PHY. The physical layer (PHY) is connected to the (MAC) layer via a transport channel, wherein data is transferred between the MAC layer and the PHY via the transport channel. Moreover, data is transferred between different physical layers, and more particularly, between one physical layer of a transmitting side and another physical layer of a receiving side via the physical channel.

The MAC layer of the second layer offers a service to a radio link control (RLC) layer located above the MAC layer via a logical channel. The RLC layer of the second layer supports reliable data transfer and is operative in segmentation and concatenation of RLC service data units (SDUs) transferred from an upper layer.

A radio resource control (RRC) layer located at a lowest level of the third layer is defined in the control plane only and is associated with configuring, reconfiguring and releasing radio bearers (RBs) to be in charge of controlling the logical, transport and physical channels. In this case, the RB indicates a service offered to the second layer for transferring data between the UE and the UTRAN. And, the configuration of the RB indicates a process for regulating characteristics of protocol layers and channels necessary for offering a specific service and a process for setting their specific parameters and operational methods, respectively.

An RRC connection and signaling connection are explained in detail as follows. First, the UE makes an RRC connection to a UTRAN to initiate communication and makes a signaling connection to a CN. The UE exchanges UE dedicated control information with the UTRAN or CN via the RRC and signaling connections. FIG. 3 is a flowchart of a process for transmitting messages exchanged between the UE and the RNC for an RRC connection and transmitting an initial direct transfer (IDT) message for a signaling connection.

Referring to FIG. 3, for an RRC connection process, a UE transmits an RRC connection request message to an RNC (S11). The RNC then transmits an RRC connection setup message to the UE in response to the RRC connection request message (S12). Afterward, the UE transmits an RRC connection setup complete message to the RNC (S13). After successful completion of the above process, the RRC connection is established between the UE and the RNC. After the RRC connection is established, the UE initiates a process for establishing a signaling connection by transmitting an IDT message (S14).

A random access channel (RACH), which is a transport channel of an asynchronous mobile communication system, such as Wideband-CDMA (WCDMA), will be explained as follows. RACH is used in transmitting data having a short length in uplink. An RRC message, such as an RRC connection request message, a cell update message, a UTRAN registration area (URA) update message and the like may be transmitted via RACH. Logical channels, such as a common control channel (CCCH), a dedicated control channel (DCCH) or a dedicated traffic channel (DTCH) can be mapped to the transport channel RACH. Moreover, the transport channel RACH may be mapped to a physical channel, such as a physical random access channel (PRACH).

FIG. 4 is a diagram illustrating a transmission method of a physical channel PRACH in accordance with the related art. Referring to FIG. 4, an uplink physical channel PRACH is divided into a preamble part and a message part. The preamble part performs a power ramping function for adjusting a proper transmission power used for a message transmission. The preamble part also performs a function for preventing collisions between several user equipments (UEs). The message part transmits a MAC packet data unit (MAC PDU) delivered to a physical channel from a MAC layer.

If a UE's MAC layer instructs a UE's physical layer to make a PRACH transmission, the UE's physical layer first selects one access slot and one signature, and then transmits a PRACH preamble to a base station (Node B) in uplink. The preamble is transmitted during an access slot interval of 1.33 ms. One signature is selected from sixteen kinds of signatures and is then transmitted for a first predetermined length of the access slot.

If the UE transmits the preamble, the base station transmits a response signal via a downlink physical channel, such as an acquisition indicator channel (AICH). The response signal transmitted via the AICH in response to the preamble carries the signature selected by the preamble for a first predetermined length of an access slot corresponding to the former access slot having carried the preamble. In this case, the base station transmits an affirmative response (ACK) or a negative response (NACK) to the UE via the signature carried by the AICH.

If the UE receives the ACK, the UE transmits a message part having a length of 10 ms or 20 ms using an orthogonal variable spreading factor (OVSF) code corresponding to the transmitted signature. If the UE receives the NACK, the UE's MAC layer instructs the UE's physical layer to repeat the PRACH transmission after a proper duration. Meanwhile, if the UE fails to receive the response signal via the AICH corresponding to the transmitted preamble, the UE transmits a new preamble after the selected access slot with a power one step higher than that of the former preamble.

FIG. 5 is a structural diagram of a downlink physical channel AICH in accordance with the related art. Referring to FIG. 5, a downlink physical channel AICH transmits a 16-symbol signature $S_I$ (i=0 . . . 15) for an access slot having a 5,120-chip length. In this case, a UE selects an arbitrary signature $S_I$ from signatures $S_0$ to $S_{15}$ and transmits the signature for a first 4,096-chip length of the access slot while setting the rest of the access slot, having a 1,024-chip length, to a transmission power "OFF" interval for transmitting no symbol. Meanwhile, a preamble part of an uplink physical channel PRACH transmits a 16-symbol signature $S_I$ (i=0 . . . 15) for a first 4,096-chip length in a way similar to that shown in FIG. 4.

However, in the related art RACH transmission method, RACH transmission power should be raised when attempting to transmit a MAC PDU having a long length via RACH. Thus, the related art is problematic because cell coverage is reduced. Moreover, because limits are put on transmitting a message having a long length, an initial setup process using RACH is elongated.

SUMMARY OF THE INVENTION

The present invention is directed to communicating a message in a mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating a message in a mobile communication system, the method comprising requesting radio resources for transmitting at least one message, receiving a response to the request for radio resources, transmitting a first message for requesting a first layer connection to a first node, and transmitting a second message for requesting a second layer connection with a second node prior to establishing the first layer connection.

Preferably, the first layer connection is a connection between a lower layer of a mobile terminal and the first node. Preferably, the second layer connection is a connection between an upper layer of a mobile terminal and the second node. Preferably, the second message is transmitted immediately after the first message is transmitted. Alternatively, the second message is transmitted simultaneously with the first message.

In one aspect of the present invention, the method further comprises receiving a response message for establishing the first layer connection, wherein the response message comprises feedback information related to the second message for requesting the second layer connection, and transmitting a third message for indicating the establishment of the first layer connection. Preferably, the method further comprises re-requesting a second layer connection with the second node if the received feedback information indicates that the second message was not successfully transmitted. Preferably, the second layer connection is re-requested after the third message is transmitted.

Preferably, the first layer connection is a radio resource control (RRC) connection and the second layer connection is a signaling connection. Preferably, the first and second messages are transmitted on a random access channel (RACH).

Preferably, the method further comprises receiving a response message from the first node related to whether the first message was successfully received by the first node.

Preferably, the first node comprises a base station.

Preferably, requesting radio resources for transmitting at least one message comprises transmitting a preamble to the first node.

Preferably, the first and second messages are radio resource control (RRC) messages. Alternatively, the first and second messages are radio link control (RLC) messages. Preferably, the first message is a radio resource control (RRC) connection request message and the second message is an initial direct transfer (IDT) message.

In accordance with another embodiment of the present invention, a method for communicating a message in a mobile communication system comprises receiving a request for radio resources for receiving at least one message, transmitting a response to the request for radio resources, receiving a first message for requesting a first layer connection to a first node, and receiving a second message for requesting a second layer connection with a second node prior to establishing the first layer connection.

Preferably, the first layer connection is a connection between a lower layer of a mobile terminal and the first node. Preferably, the second layer connection is a connection between an upper layer of a mobile terminal and the second node.

In one aspect of the invention, the method further comprises transmitting a response message for establishing the first layer connection, wherein the response message comprises feedback information related to the second message for requesting the second layer connection, and receiving a third message for indicating the establishment of the first layer connection. Preferably, the method further comprises receiving a message for re-requesting a second layer connection with the second node if the transmitted feedback information indicates that the second message was not received. Preferably, the message for re-requesting the second layer connection is received after the third message is received.

Preferably, the first layer connection is a radio resource control (RRC) connection and the second layer connection is a signaling connection. Preferably, the first and second messages are received on a random access channel (RACH).

Preferably, the method further comprises transmitting a response message from the first node related to whether the first message was successfully received by the first node.

Preferably, the first node comprises a base station.

Preferably, receiving a request for radio resources for receiving at least one message comprises receiving a preamble at the first node.

Preferably, the first and second messages are radio resource control (RRC) messages. Alternatively, the first and second messages are radio link control (RLC) messages. Preferably, the first message is a radio resource control (RRC) connection request message and the second message is an initial direct transfer (IDT) message.

In accordance with another embodiment of the present invention, a mobile terminal for communicating a message in a mobile communication system comprises a processor for requesting radio resources for transmitting at least one message, a receiver controlled by the processor for receiving a response to the request for radio resources, and a transmitter controlled by the processor for transmitting a first message for requesting a first layer connection to a first node and transmitting a second message for requesting a second layer connection with a second node prior to establishing the first layer connection.

Preferably, the first layer connection is a connection between a lower layer of the mobile terminal and the first node. Preferably, the second layer connection is a connection between an upper layer of the mobile terminal and the second node. Preferably, the second message is transmitted immediately after the first message is transmitted. Alternatively, the second message is transmitted simultaneously with the first message.

In one aspect of the present invention, the receiver receives a response message for establishing the first layer connection, wherein the response message comprises feedback information related to the second message for requesting the second layer connection, and the transmitter transmits a third message for indicating the establishment of the first layer connection. Preferably, the processor re-requests a second layer connection with the second node if the received feedback information indicates that the second message was not successfully transmitted.

Preferably, the second layer connection is re-requested after the third message is transmitted. Preferably, the first layer connection is a radio resource control (RRC) connection and the second layer connection is a signaling connection. Preferably, the first and second messages are transmitted on a random access channel (RACH).

Preferably, the receiver receives a response message from the first node related to whether the first message was successfully received by the first node.

Preferably, the first node comprises a base station.

Preferably, the transmitter requests radio resources for transmitting at least one message by transmitting a preamble to the first node.

Preferably, the first and second messages are radio resource control (RRC) messages. Alternatively, the first and second messages are radio link control (RLC) messages. Preferably, the first message is a radio resource control (RRC) connection request message and the second message is an initial direct transfer (IDT) message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to communicating a message in a mobile communication system. Reference will now be made in detail to the preferred embodiments of the present invention, examples of which are illustrated in the accompanying drawings.

Figure 1:
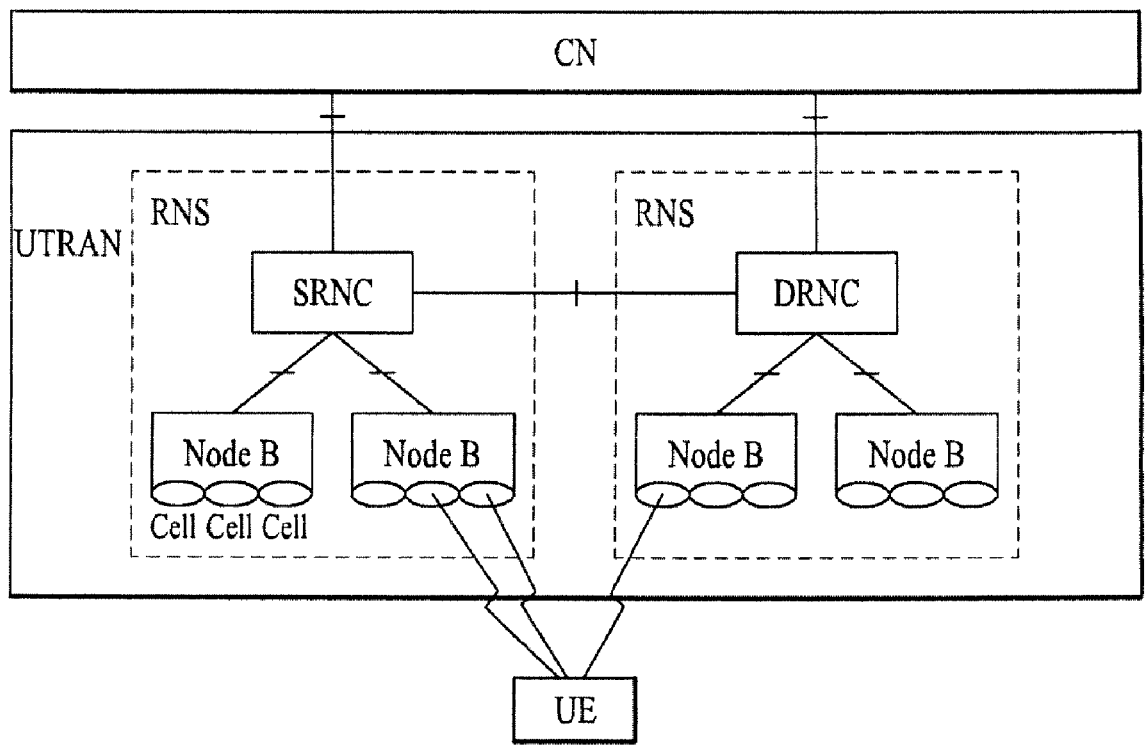
FIG. 1 is a block diagram of a network structure of a universal mobile telecommunications system (UMTS).
Figure 2:
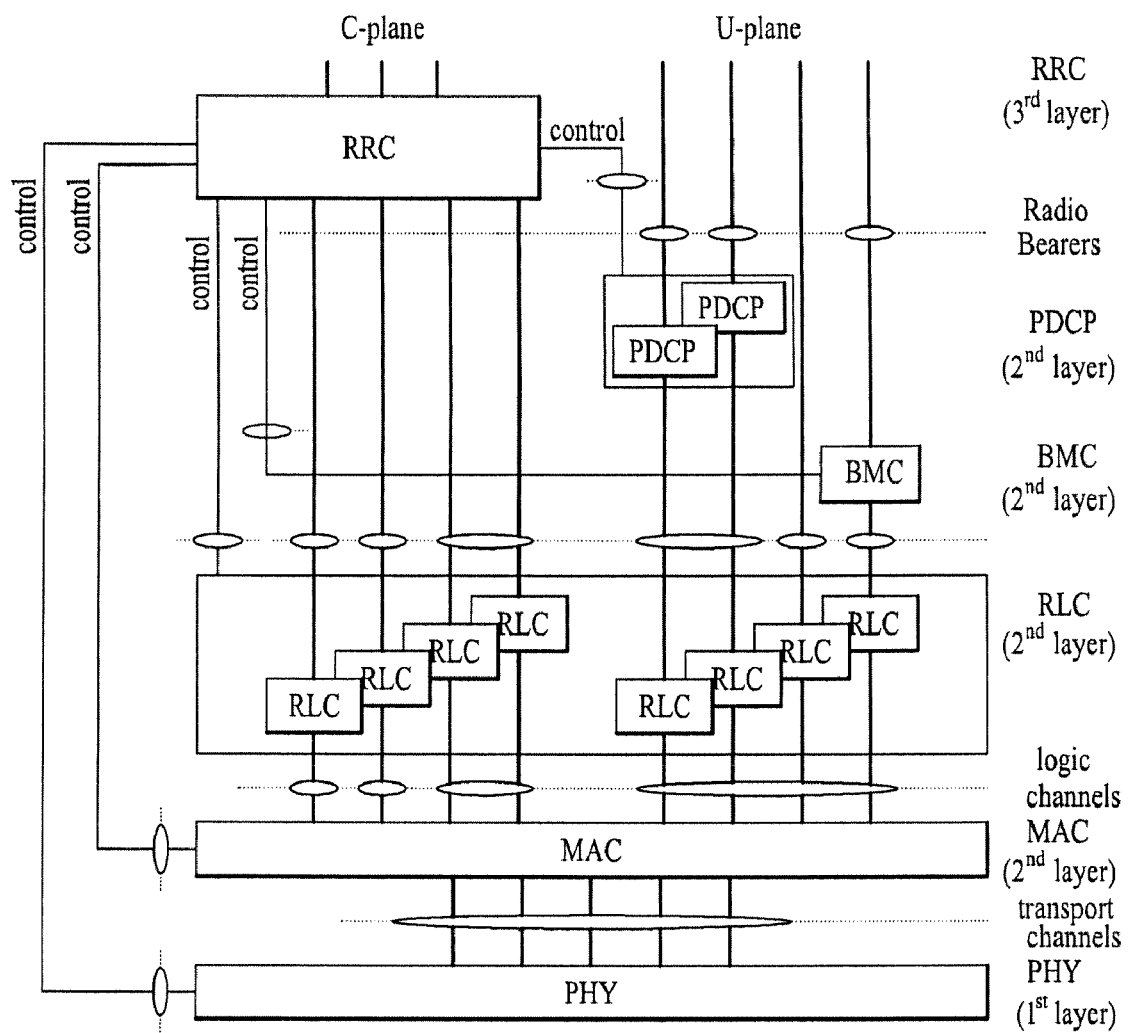
FIG. 2 is an architectural diagram of a radio interface protocol between the UE and the UTRAN based on a 3GPP radio access network standard.
Figure 3:
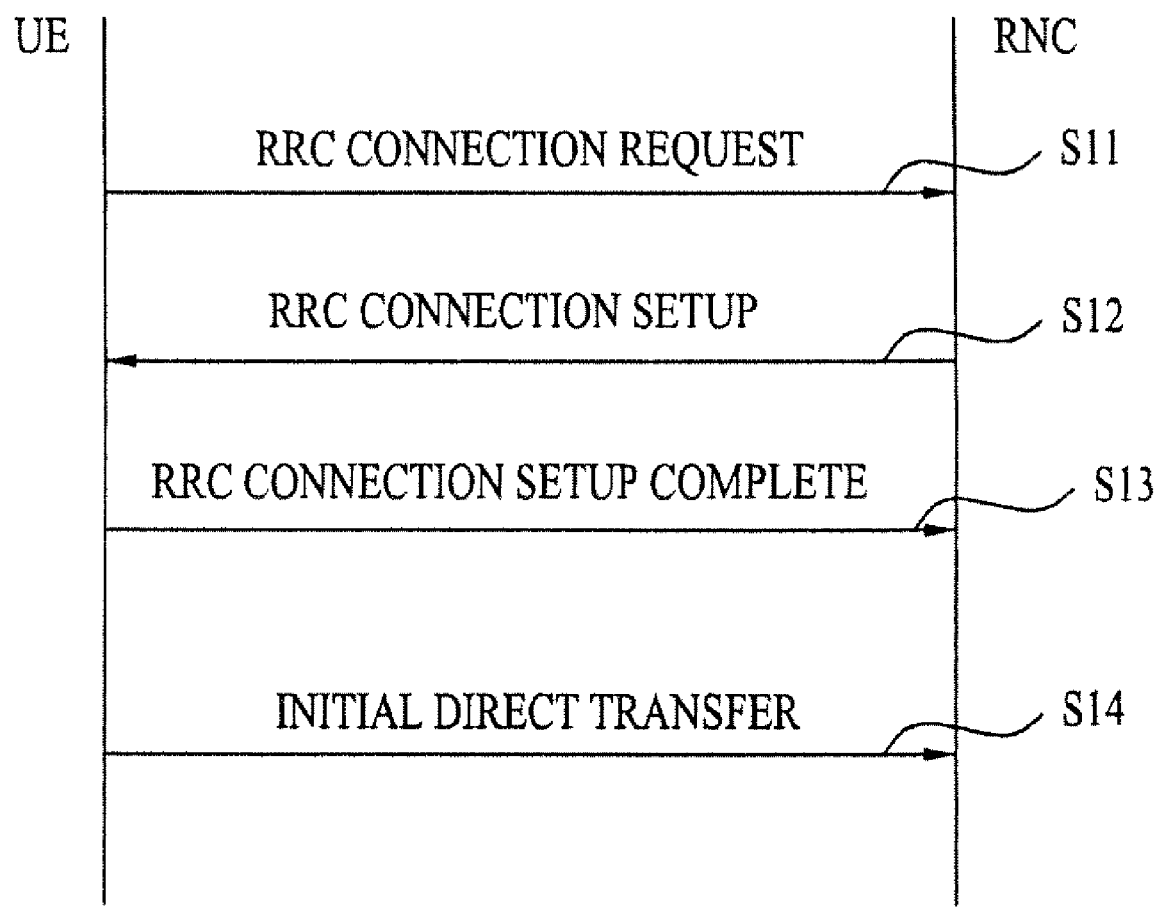
FIG. 3 is a flowchart of a process for transmitting messages exchanged between the UE and the RNC for an RRC connection and transmitting an initial direct transfer (IDT) message for a signaling connection.
Figure 4:
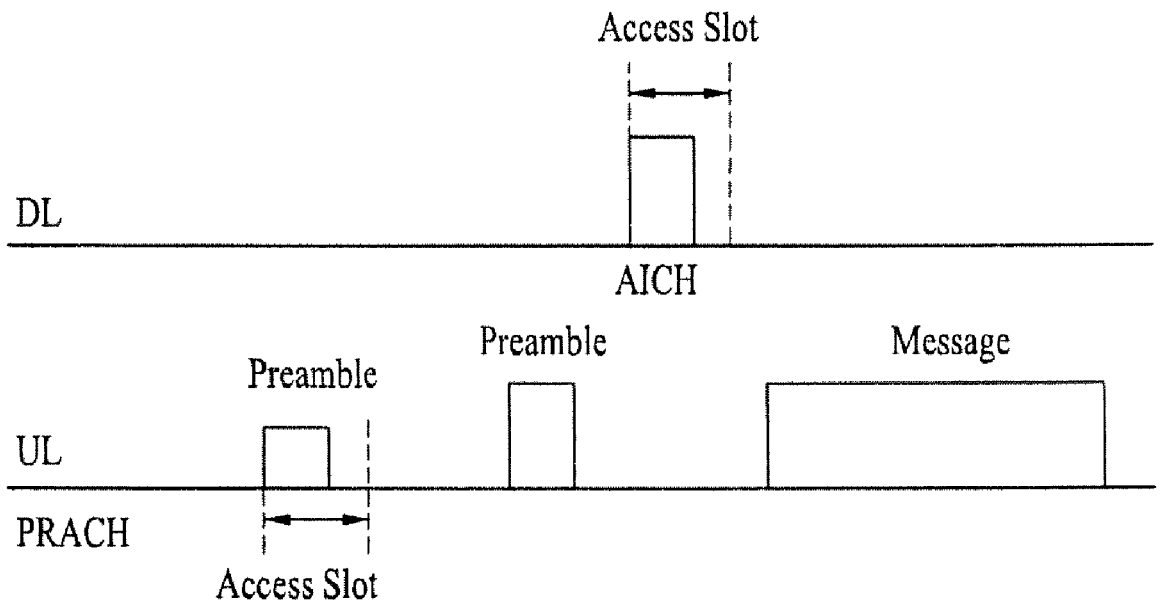
FIG. 4 is a diagram illustrating a transmission method of a physical channel PRACH in accordance with the related art.
Figure 5:
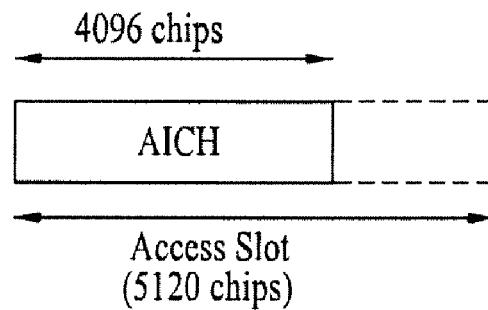
FIG. 5 is a structural diagram of a downlink physical channel AICH in accordance with the related art.
Figure 6:
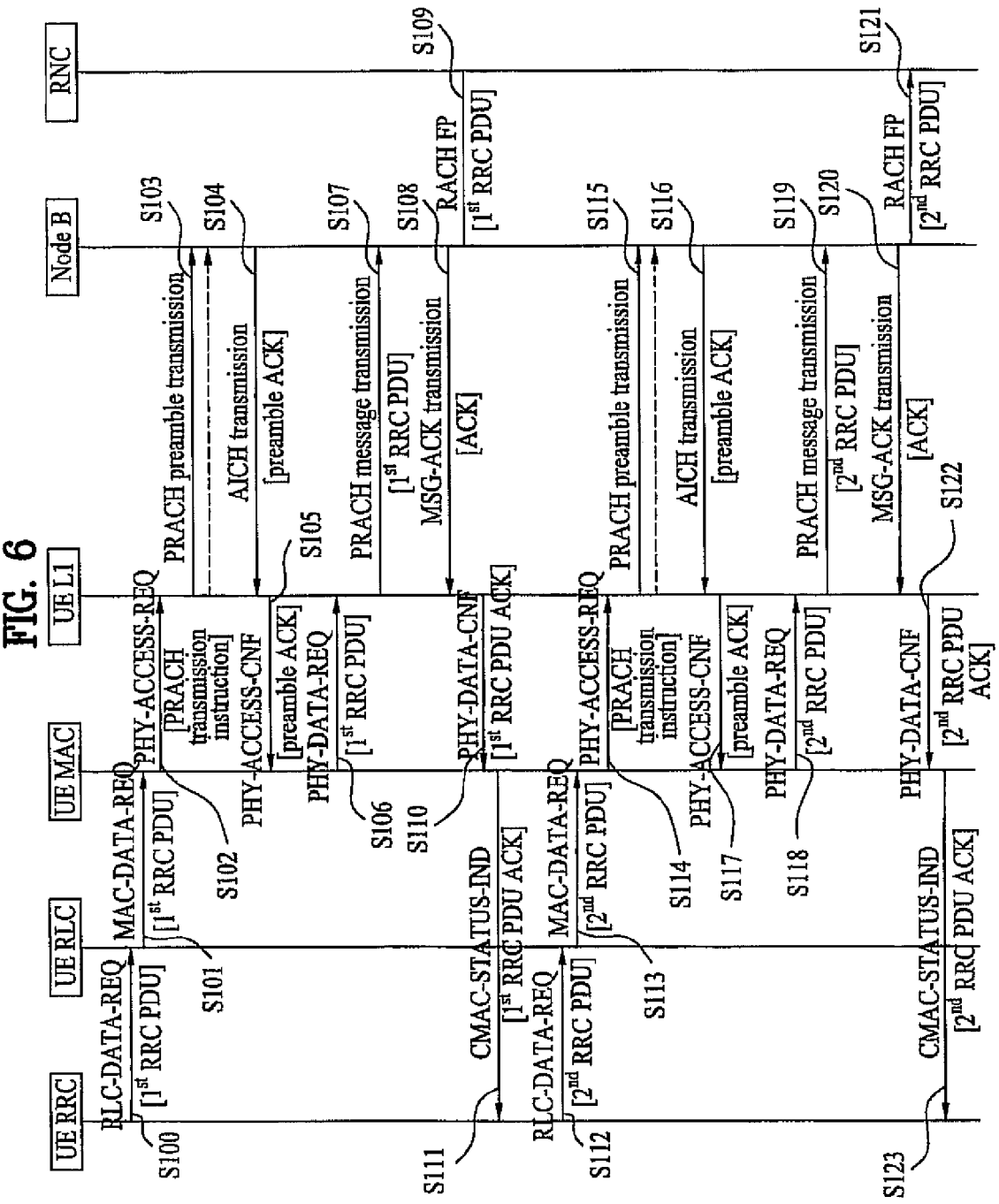
FIG. 6 is a flowchart illustrating a method for communicating a message in accordance with one embodiment of the present invention.

FIG. 6 is a flowchart illustrating a method for communicating a message in accordance with one embodiment of the present invention. Referring to FIG. 6, a UE may divide one RRC message into two RRC PDUs to transmit through two RACH messages. Alternatively, the UE may append two RRC PDUs, corresponding to two RRC messages, to two RACH messages to transmit. Preferably, both of the two RACH messages are successfully transmitted in initial transmission.

A UE RRC layer delivers a first RRC PDU, for inclusion in an RACH message to be firstly transmitted, to an RLC layer via an RLC-DATA-REQ primitive [S100]. The RLC layer then generates an RLC PDU from the first RRC PDU and delivers the RLC PDU to a MAC layer via a MAC-DATA-REQ primitive [S101].

The MAC layer initiates an RACH process. In the RACH process, the MAC layer performs a persistency test at least once for deciding whether to perform a transmission according to a probability set by the RRC layer. Preferably, the MAC layer instructs a physical layer to initiate a PRACH transmission process via a PHY-ACCESS-REQ primitive after a prescribed duration [S102].

The physical layer of the UE initiates the PRACH transmission process. In doing so, the physical layer transmits a PRACH preamble to a base station (Node B) [S103]. If there is no response to the preamble from the base station for a predetermined time, the physical layer increases a transmission power by a predetermined level and transmits the preamble again.

In case that the base station receives the preamble, a physical layer of the base station transmits a signal in response to the preamble via an acquisition indicator channel (AICH) [S104]. If the UE receives an acknowledgment (ACK) response to the preamble via the AICH, the physical layer of the UE informs the UE MAC layer of the acknowledged preamble via a PHY-ACCESS-CNF primitive [S105]. The UE MAC layer then delivers a MAC PDU including the first RRC PDU to the UE physical layer via a PHY-DATA-REQ primitive [S106]. Afterward, the UE transmits the MAC PDU including the first RRC PDU to the Node B via a PRACH message part [S107].

The Node B decides whether the MAC PDU including the first RRC PDU is correctly received by performing a cyclic redundancy check (CRC) of the received PRACH message and the like. If the MAC PDU including the first RRC PDU is received correctly, the Node B transmits an ACK to the UE via a MSG-ACK channel [S108] to indicate that the PRACH message part is correctly received. If the MAC PDU including the first RRC PDU is received incorrectly, the Node B transmits a non-acknowledgment response (NACK) via a MSG-ACK channel or does not transmit any information for the corresponding access slot.

If the MAC PDU including the first RRC PDU is received correctly, the Node B delivers the successfully received MAC PDU including the first RRC PDU to an RNC via a RACH frame protocol (RACH FP). Accordingly, the first RRC PDU included in the MAC PDU is then delivered to an RRC layer of the RNC [S109].

Preferably, the UE physical layer informs the UE MAC layer, via a PHY-DATA-CNF primitive [S110], that the MAC PDU including the first RRC PDU was successfully transmitted. The UE MAC layer then informs the UE RRC layer, via a CMAC-STATUS-IND primitive [S111], that the first RRC PDU was successfully transmitted.

Preferably, the UE RRC layer delivers a second RRC PDU, for inclusion in an RACH message to be secondly transmitted, to the UE RLC layer via an RLC-DATA-REQ primitive [S112]. The UE RLC layer then generates an RLC PDU from the second RRC PDU and delivers it to the UE MAC layer via a MAC-DATA-REQ primitive [S113].

Preferably, the UE MAC layer initiates the RACH process. In doing so, the UE MAC layer performs the persistency test at least once for deciding whether to perform a transmission according to the probability set by the RRC layer. Preferably, the UE MAC layer instructs the physical layer to initiate the PRACH process after a predetermined duration via a PHY-ACCESS-REQ primitive [S114]. Alternatively, for the second RACH process and the RRC PDU transmission thereafter, the UE MAC layer can instruct the physical layer to immediately initiate the PRACH transmission process via a PHY-ACCESS-REQ primitive without the persistency test or the predetermined back-off duration.

The UE physical layer initiates the PRACH transmission process. Accordingly, the UE physical layer transmits a PRACH preamble [S115]. If no response to the preamble is received for a predetermined time, the UE physical layer increases a transmission power by a predetermined level and transmits the preamble again. If the Node B (base station) receives the preamble, the Node B physical layer transmits a signal in response to the preamble via AICH [S116]. If the UE receives an ACK response to the preamble via the AICH, the UE physical layer informs the UE MAC layer of the ACK of the preamble via a PHY-ACCESS-CNF primitive [S117].

The UE MAC layer then delivers a MAC PDU including the second RRC PDU to the UE physical layer via a PHY-DATA-REQ primitive [S118]. The UE then transmits the MAC PDU including the second RRC PDU to the Node B via a PRACH message part [S119].

The Node B decides whether the MAC PDU including the second RRC PDU is correctly received by performing a cyclic redundancy check (CRC) of the received PRACH message and the like. If the MAC PDU including the second RRC PDU is received correctly, the Node B transmits ACK to the UE via an MSG-ACK channel to indicate that the PRACH message part is correctly received [S120]. If the MAC PDU including the second RRC PDU is received incorrectly, the Node B transmits NACK via the MSG-ACK channel or does not transmit any information for the corresponding access slot.

If the MAC PDU including the second RRC PDU is received correctly, the Node B delivers the successfully received MAC PDU including the second RRC PDU to the RNC via a RACH frame protocol (RACH FP). The second RRC PDU included in the MAC PDU is then delivered to the RRC layer of the RNC [S121]. Accordingly, the RRC layer of the RNC acquires the RRC message transmitted by the UE RRC layer from the received first and second RRC PDUs.

Preferably, the UE physical layer informs the UE MAC layer, via a PHY-DATA-CNF primitive, that the MAC PDU including the second RRC PDU was successfully transmitted [S122]. The UE MAC layer then informs the UE RRC layer, via a CMAC-STATUS-IND primitive, that the second RRC PDU was successfully transmitted [S123].

Figure 7:
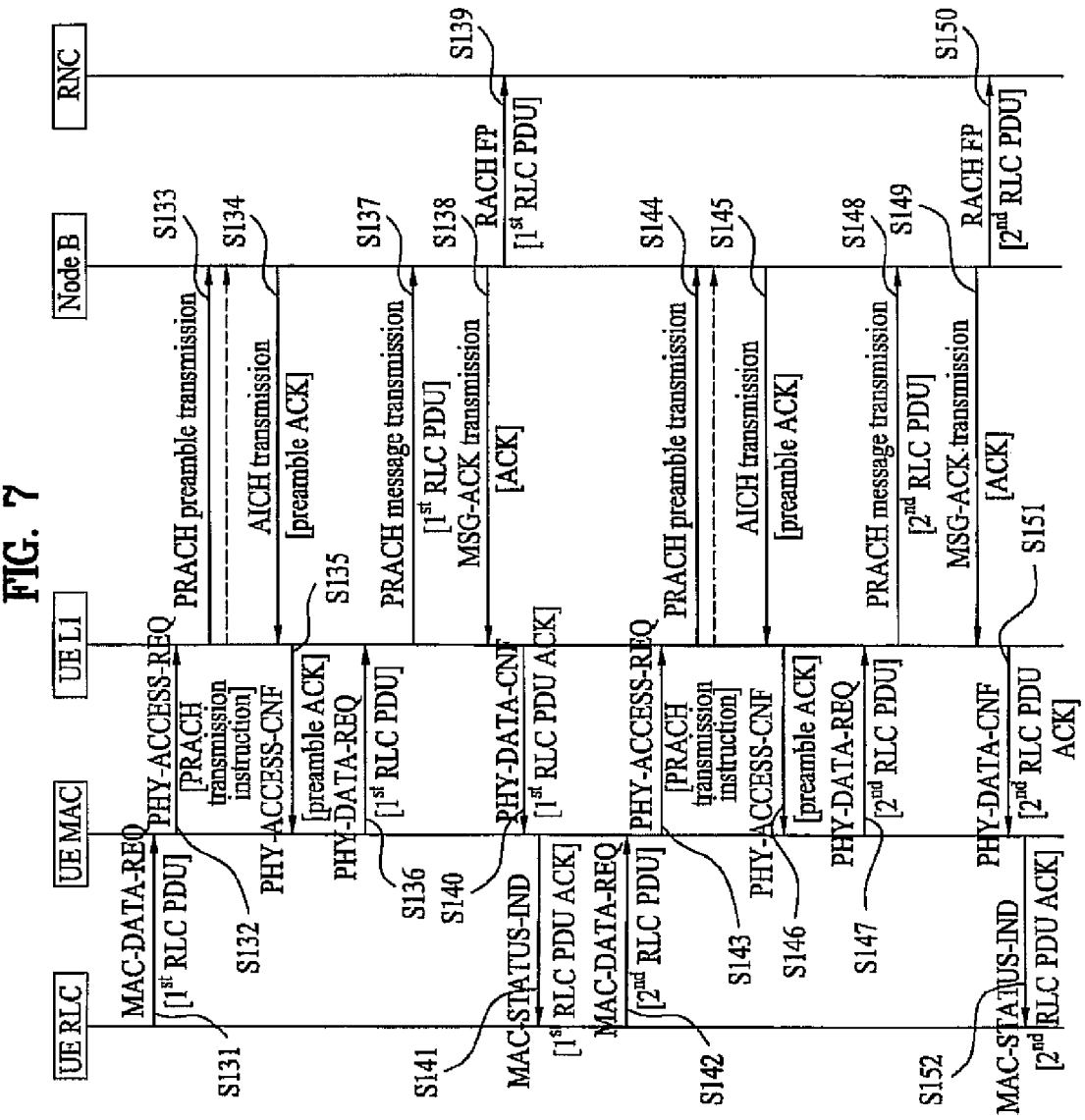
FIG. 7 is a flowchart illustrating a method for communicating a message in accordance with one embodiment of the present invention.

FIG. 7 is a flowchart illustrating a method for communicating a message in accordance with one embodiment of the present invention. Referring to FIG. 7, a UE RLC layer may divide one upper layer PDU into two RRC PDUs to transmit as two RACH messages. Alternatively, the UE RLC layer may transmit two RRC PDUs corresponding to two upper layer PDUs as two RACH messages appended together. Preferably, both of the two RACH messages are successfully transmitted in an initial transmission.

A UE RLC layer generates a first RLC PDU and delivers it to a MAC layer via a MAC-DATA-REQ primitive [S131]. The MAC layer initiates an RACH process. In the RACH process, the MAC layer performs a persistency test at least once for deciding whether to perform a transmission according to a probability set by an RRC layer. Preferably, the MAC layer instructs a physical layer to initiate a PRACH transmission process via a PHY-ACCESS-REQ primitive after a prescribed duration [S132].

The UE physical layer initiates the PRACH transmission process. In doing so, the physical layer transmits a PRACH preamble to a base station (Node B) [S133]. If no response to the preamble is received from the base station for a predetermined time, the physical layer increases a transmission power by a predetermined level and transmits the preamble again.

If the base station (Node B) receives the preamble, a physical layer of the base station transmits a signal in response to the preamble via AICH [S134]. If the UE receives an ACK response to the preamble via the AICH, the UE physical layer informs the UE MAC layer of the ACK of the preamble via a PHY-ACCESS-CNF primitive [S135].

The UE MAC layer then delivers the MAC PDU including the first RLC PDU to the UE physical layer via a PHY-DATA-REQ primitive [S136]. Afterward, the UE transmits the MAC PDU including the first RLC PDU to the Node B via a PRACH message part [S137].

The Node B decides whether the MAC PDU including the first RLC PDU was correctly received by performing a cyclic redundancy check (CRC) of the received PRACH message and the like. If the MAC PDU including the first RLC PDU is received correctly, the Node B transmits to the UE an ACK via an MSG-ACK channel [S138] to indicate that the PRACH message part was correctly received. If the MAC PDU including the first RLC PDU is received incorrectly, the Node B transmits a NACK via an MSG-ACK channel or does not transmit any information for the corresponding access slot.

If the MAC PDU including the first RLC PDU is received correctly, the Node B delivers the successfully received MAC PDU including the first RLC PDU to an RNC via a RACH frame protocol (RACH FP). The first RLC PDU included in the MAC PDU is then delivered to an RLC layer of the RNC [S139].

The UE physical layer informs the UE MAC layer, via a PHY-DATA-CNF primitive [S140], that the MAC PDU including the first RLC PDU was successfully transmitted. The UE MAC layer then informs the UE RLC layer, via a CMAC-STATUS-IND primitive [S141], that the first RLC PDU was successfully transmitted.

Preferably, the UE RLC layer delivers a second RLC PDU to the UE MAC layer via a MAC-DATA-REQ primitive [S142]. The UE MAC layer then initiates the RACH process. In this process, the UE MAC layer performs a persistency test at least once to decide whether to perform a transmission according to a probability set by the RRC layer. Preferably, the UE MAC layer instructs the physical layer to initiate a PRACH transmission process after a predetermined duration via a PHY-ACCESS-REQ primitive [S143]. Alternatively, for the second RACH process and the RLC PDU transmission thereafter, the UE MAC layer can instruct the physical layer to immediately initiate the PRACH transmission process via a PHY-ACCESS-REQ primitive without the persistency test or the predetermined back-off duration.

Preferably, the UE physical layer initiates the PRACH transmission process. In doing so, the UE physical layer transmits a PRACH preamble [S144]. If there is no response to the preamble for a predetermined time, the UE physical layer increases a transmission power by a predetermined level and transmits the preamble again.

If the Node B (base station) receives the preamble, the Node B physical layer transmits a response signal to the preamble via AICH [S145]. If the UE physical layer receives an ACK response to the preamble via the AICH, the UE physical layer informs the UE MAC layer of the ACK of the preamble via a PHY-ACCESS-CNF primitive [S146]. The UE MAC layer then delivers a MAC PDU including the second RLC PDU to the UE physical layer via a PHY-DATA-REQ primitive [S147]. Afterward, the UE transmits the MAC PDU including the second RLC PDU to the Node B via a PRACH message part [S148].

The Node B decides whether the MAC PDU including the second RLC PDU is correctly received by performing a cyclic redundancy check (CRC) of the received PRACH message and the like. If the MAC PDU including the second RLC PDU is received correctly, the Node B transmits, to the UE via an MSG-ACK channel [S149], an ACK indicating that the PRACH message part was correctly received. If the MAC PDU including the second RLC PDU is received incorrectly, the Node B transmits a NACK via an MSG-ACK channel or does not transmit any information for the corresponding access slot.

If the MAC PDU including the second RLC PDU is received correctly, the Node B delivers the successfully received MAC PDU including the second RLC PDU to the RNC via a RACH frame protocol (RACH FP). Afterward, the second RLC PDU included in the MAC PDU is delivered to the RLC layer of the RNC [S150]. Accordingly, the RLC layer of the RNC acquires the PDU of the UE upper layer from the received first and second RLC PDUs.

The UE physical layer informs the UE MAC layer, via a PHY-DATA-CNF primitive [S151], that the MAC PDU including the second RLC PDU was successfully transmitted. The UE MAC layer then informs the UE RLC layer, via a CMAC-STATUS-IND primitive [S152], that the second RLC PDU was successfully transmitted.

Meanwhile, the RNC can designate a specific access slot, a specific code such as a signature, or a specific MAC header coding value, such as a specific TCTF coding value for a usage of RACH that uses ACK. Accordingly, a limitation may be set in the following manner. Preferably, the Node B may transmit ACK or NACK via a MSG-ACK channel if the Node B receives the specific access slot, code or MAC header code value in the method according to one embodiment of the present invention.

Preferably, if ACK of a message is needed, the UE transmits PRACH using a specific access slot, a specific code or a specific MAC header coding value. In this case, the Node B transmits ASK or NACK via the MSG-ACK channel if the Node B receives a PRACH message transmitted using the specific access slot, specific code or specific MAC header coding value. In case of receiving a PRACH message transmitted using another access slot, code or MAC header code value instead of using the specific access slot, specific code or specific MAC header coding value, the Node B does not transmit ACK or NACK via the MSG-ACK channel.

Figure 8:
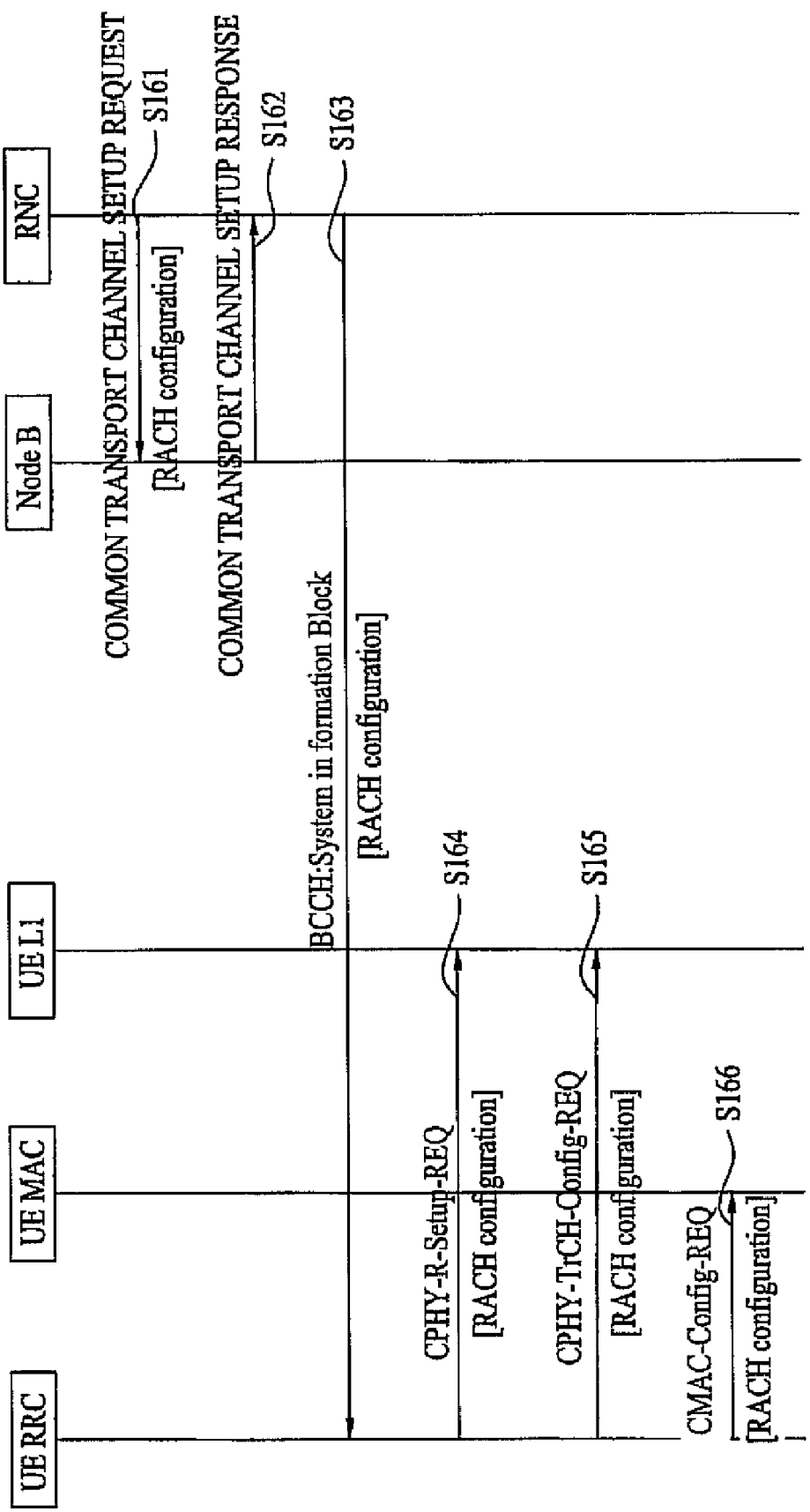
FIG. 8 is a flowchart of an RACH configuration method in accordance with one embodiment of the present invention.

FIG. 8 is a flowchart of an RASH configuration method in accordance with one embodiment of the present invention. Referring to FIG. 8, RACH configuration information includes information for configuring RACH that uses ACK, information for configuring AICH and information for configuring an MSG-ACK channel. Furthermore, the RACH configuration information includes channel transmission power information and channel transmission timing information.

Still referring to FIG. 8, the RNS configures the RACH that uses ACK by delivering a COMMON TRANSPORT CHANNEL SETUP REQUEST message to the Node B [S161]. In doing so, a limitation can be put on the RNS to transmit ACK or NACK via the MSG-ASK channel if the Node B receives a specific access slot, a specific code or a specific MAC header code value. After completing the reception according to the RASH configuration information, the Node B transmits a COMMON TRANSPORT CHANNEL SETUP RESPONSE message to the RNC [S162].

Preferably, an RRC layer of the RNC includes the RACH configuration information in a system information block (SIB). Accordingly, the SIB is broadcast to a UE via a broadcast common channel (BCCH) [S163]. The UE acquires the RACH configuration information by receiving the SIB transmitted via BCCH. Preferably, SIB Type 5 or 6 is used for transmitting the RACH configuration information.

Subsequently, an RRC layer of the UE sets a physical channel PRACH transmission according to the RACH configuration information via a CPHY-RL-Setup-REQ primitive

[S164]. The RRC layer of the UE then sets a transport channel RACH transmission according to the RACH configuration information via a CPHY-TrCH-Config-REQ primitive [S165]. Finally, the RRC layer of the UE sets a transport channel RACH transmission according to the RACH configuration information via a CMAC-Config-REQ primitive [S166].

Figure 9:
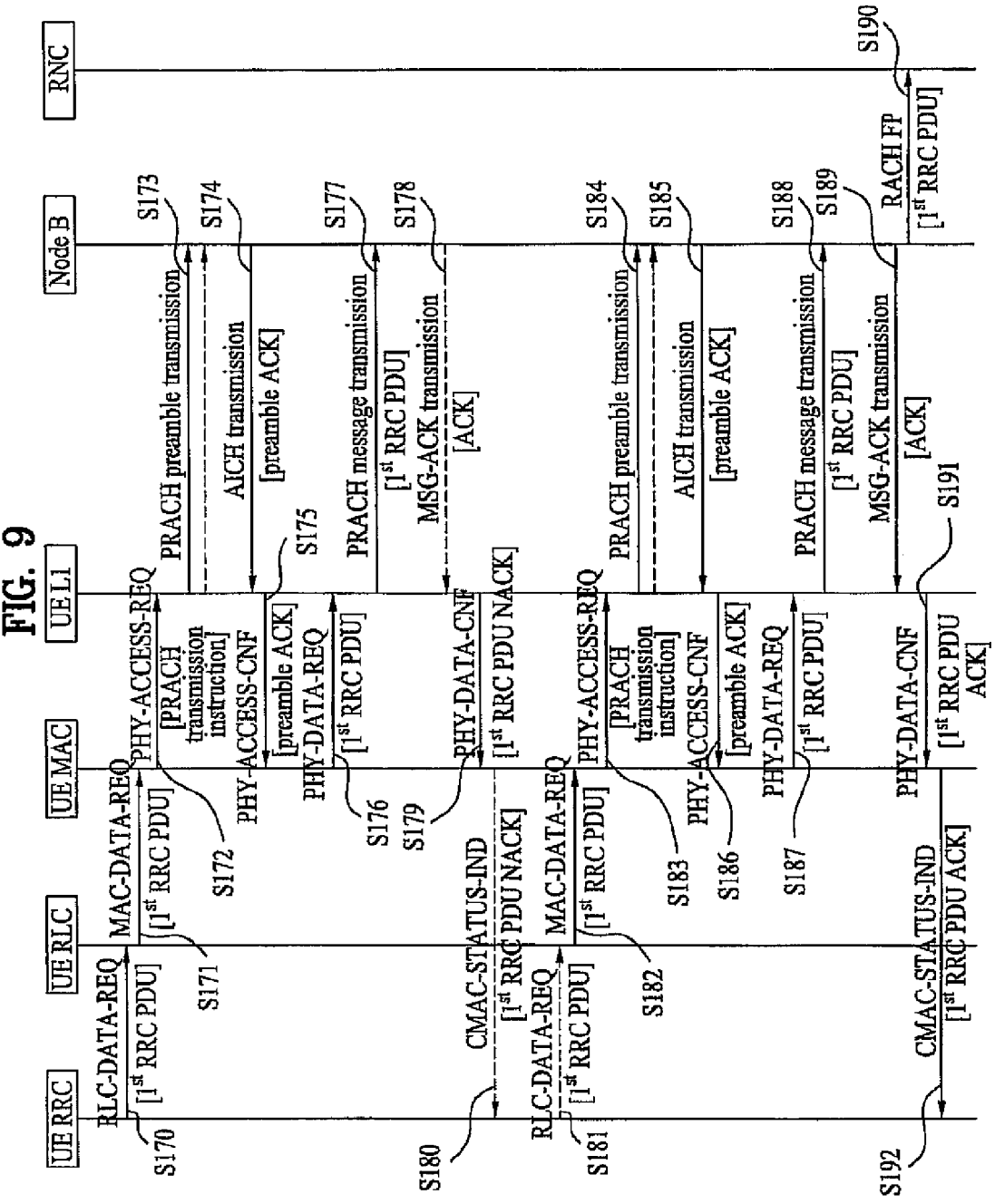
FIG. 9 is a flowchart illustrating retransmission of a first PRACH message in accordance with one embodiment of the present invention.

FIG. 9 is a flowchart illustrating retransmission of a first PRACH message in accordance with one embodiment of the present invention. Referring to FIG. 9, an RRC layer of a UE delivers a first RRC PDU, for inclusion in a firstly transmitted RACH message, to an RLC layer via an RLC-DATA-REQ primitive [S170]. The RLC layer then generates an RLC PDU from the first RRC PDU and delivers the RLC PDU to a MAC layer via a MAC-DATA-REQ primitive [S171].

The MAC layer initiates an RACH process. In the RACH process, the MAC layer performs a persistency test at least once for deciding whether to perform a transmission according to a probability set by the RRC layer. Preferably, the MAC layer instructs a physical layer to initiate a PRACH transmission process via a PHY-ACCESS-REQ primitive after a prescribed duration [S172].

The physical layer of the UE initiates the PRACH transmission process. In doing so, the physical layer transmits a PRACH preamble to a base station (Node B) [S173]. If no response to the preamble is received by the UE from the base station for a predetermined time, the physical layer increases a transmission power by a predetermined level and transmits the preamble again.

If the base station receives the preamble, a physical layer of the base station transmits a signal in response to the preamble via AICH [S174]. If the UE receives an ACK response to the preamble via the AICH, the physical layer of the UE informs the UE MAC layer of the ACK for the preamble via a PHY-ACCESS-CNF primitive [S175]. Accordingly the UE MAC layer delivers a MAC PDU including the first RRC PDU to the UE physical layer via a PHY-DATA-REQ primitive [S176]. The UE then transmits the MAC PDU including the first RRC PDU to the Node B via a PRACH message part [S177].

The Node B decides whether the MAC PDU including the first RRC PDU is correctly received by performing a cyclic redundancy check (CRC) of the received PRACH message and the like. If the MAC PDU including the first RRC PDU is received incorrectly, the Node B transmits NACK via an MSG-ACK channel or does not transmit any information for the corresponding access slot [S178].

If the NACK via the MSG-ACK channel is not received or if ACK or NACK via the MSG-ACK channel is not received for a corresponding access slot, the UE physical layer informs the UE MAC layer, via a PHY-DATA-CNF primitive [S179], that the MAC PDU including the first RRC PDU was not successfully transmitted.

The UE may operate differently by distinguishing between a case where NACK via the MSG-ACK channel is received and a case where no response of any kind is received via the MSG-ACK channel. Preferably, if the UE receives NACK, the UE physical layer informs the MAC layer that NACK is received. Accordingly, the UE MAC layer delays a transmission for a back-off time period corresponding to the NACK and executes from step S182 in FIG. 9.

If the UE receives no response, the UE physical layer delays a transmission for a back-off time period and executes from step S183 in FIG. 9. Alternatively, if the UE receives no response, the UE physical layer informs the MAC layer that a response is not received. The UE MAC layer then delays a transmission for a back-off time period and executes from the step S182.

Preferably, the UE MAC layer informs the UE RRC layer that the first RRC PDU was not successfully transmitted via a CMAC-STATUS-IND primitive and requests a retransmission [S180]. The UE RRC layer then retransmits the first RRC PDU to the UE RLC layer via a RLC-DATA-REQ primitive [S181].

The UE RLC layer generates a second RLC PDU from a second RRC PDU and delivers the second RLC PDU to the UE MAC layer via a MAC-DATA-REQ primitive [S182]. However, if the UE RLC layer or the UE MAC layer stores the previously transmitted first RRC PDU, the UE can skip the steps S181 and S182.

The UE MAC layer initiates the RACH process. In this process, the UE MAC layer performs the persistency test at least once for deciding whether to perform a transmission according to the probability set by the RRC layer. The UE MAC layer then instructs the UE physical layer to initiate the PRACH process after a predetermined duration via a PHY-ACCESS-REQ primitive [S183]. Alternatively, for the second RACH process and the RACH transmission thereafter, the UE MAC layer can instruct the physical layer to immediately initiate the PRACH transmission process via a PHY-ACCESS-REQ primitive without the persistency test or the predetermined back-off duration.

The UE physical layer initiates the PRACH transmission process. In doing so, the UE physical layer transmits a PRACH preamble [S184]. If no response to the preamble is received for a predetermined time, the UE physical layer increases a transmission power by a predetermined level and transmits the preamble again.

If the Node B (base station) receives the preamble, the Node B physical layer transmits a signal in response to the preamble via AICH [S185]. If the UE receives an ACK response for the preamble via the AICH, the UE physical layer informs the UE MAC layer of the ACK for the preamble via a PHY-ACCESS-CNF primitive [S186]. The UE MAC layer then delivers a MAC PDU including the first RRC PDU to the UE physical layer via a PHY-DATA-REQ primitive [S187]. Afterward, the UE transmits the MAC PDU including the first RRC PDU to the Node B via a PRACH message part [S188].

The Node B decides whether the MAC PDU including the first RRC PDU is correctly received by performing a cyclic redundancy check (CRC) of the received PRACH message and the like. If the MAC PDU including the first RRC PDU is received correctly, the Node B transmits ACK to the UE via a MSG-ACK channel [S189] to indicate that the PRACH message part was correctly received. If the MAC PDU including the first RRC PDU is received incorrectly, the Node B transmits NACK via the MSG-ACK channel or does not transmit any information for the corresponding access slot.

If the MAC PDU including the first RRC PDU is received correctly, the Node B delivers the successfully received MAC PDU including the first RRC PDU to the RNC via a RACH frame protocol (RACH FP) [S190]. The first RRC PDU included in the MAC PDU is then delivered to the RRC layer of the RNC.

Afterward, the UE physical layer informs the UE MAC layer, via a PHY-DATA-CNF primitive [S191], that the MAC PDU including the first RRC PDU was successfully transmitted. The UE MAC layer then informs the UE RRC layer, via a CMAC-STATUS-IND primitive [S192], that the first RRC PDU was successfully transmitted.

Figure 10:
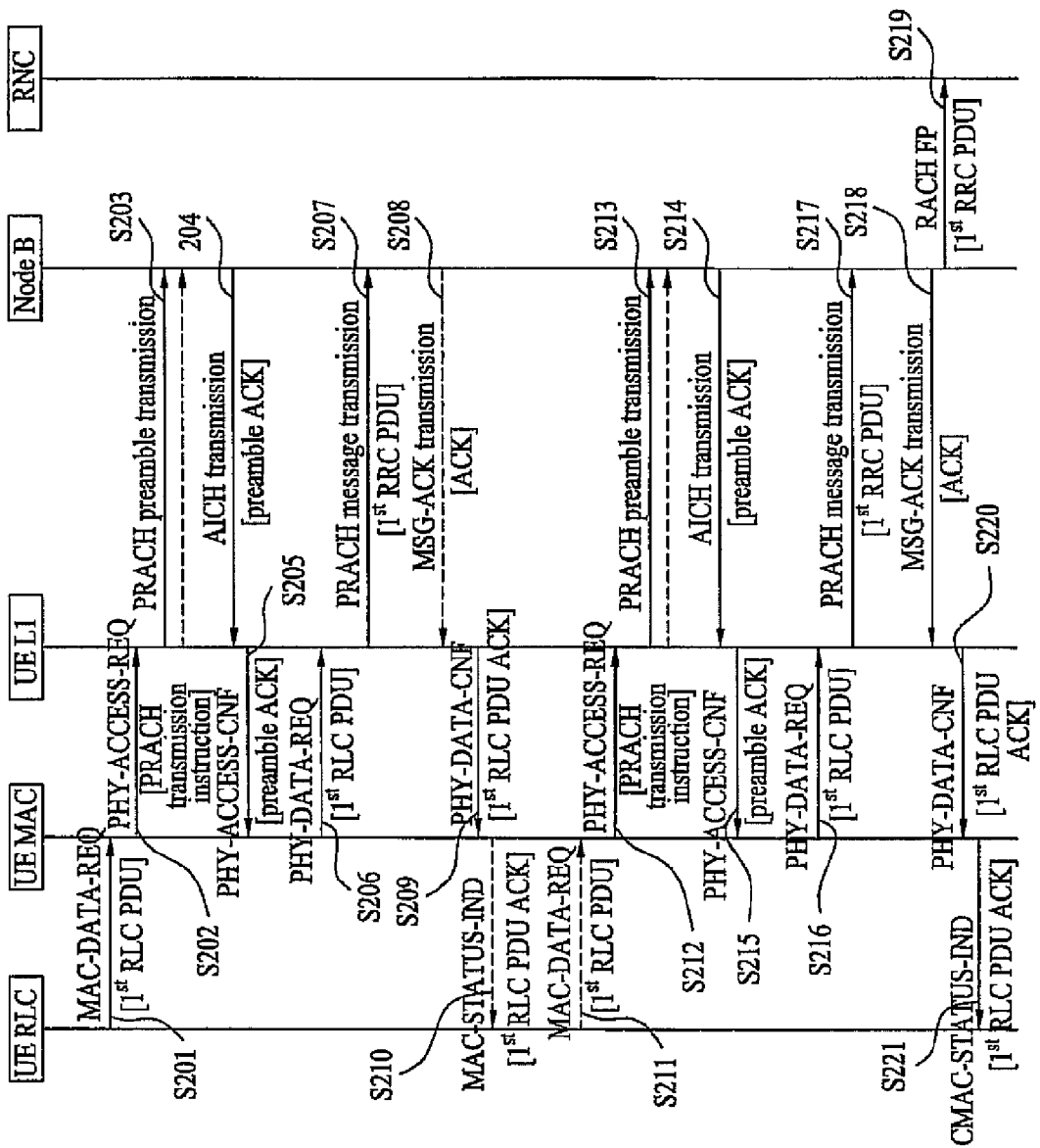
FIG. 10 is a flowchart illustrating retransmission of a first PRACH message in accordance with one embodiment of the present invention.

FIG. 10 is a flowchart illustrating retransmission of a first PRACH message in accordance with one embodiment of the present invention. Preferably, the embodiment shown in FIG. 10 is similarly applicable to a following retransmission.

Referring to FIG. 10, a UE RLC layer generates an RLC PDU and delivers it to a MAC layer of the UE via a MAC-DATA-REQ primitive [S201]. The MAC layer initiates an RACH process. In the RACH process, the MAC layer performs a persistency test at least once for deciding whether to perform a transmission according to a probability set by an RRC layer. Preferably, the MAC layer instructs a physical layer to initiate a PRACH transmission process via a PHY-ACCESS-REQ primitive after a prescribed duration [S202].

The UE physical layer initiates the PRACH transmission process. In doing so, the physical layer transmits a PRACH preamble to a base station (Node B) [S203]. If the UE does not receive a response to the preamble from the base station for a predetermined time, the UE physical layer increases a transmission power by a predetermined level and transmits the preamble again.

If the base station (Node B) receives the preamble, a physical layer of the base station transmits a signal in response to the preamble via AICH [S204]. If the UE receives an ACK response for the preamble via the AICH, the UE physical layer informs the UE MAC layer of the ACK for the preamble via a PHY-ACCESS-CNF primitive [S205]. The UE MAC layer then delivers a MAC PDU including the first RLC PDU to the UE physical layer via a PHY-DATA-REQ primitive [S206]. Afterward, the UE transmits the MAC PDU including the first RLC PDU to the Node B via a PRACH message part [S207].

The Node B decides whether the MAC PDU including the first RLC PDU was correctly received by a performing a cyclic redundancy check (CRC) of the received PRACH message and the like. If the MAC PDU including the first RLC PDU is received incorrectly, the Node B transmits NACK via a MSG-ACK channel or does not transmit any information for the corresponding access slot [S208].

If the UE receives the NACK via the MSG-ACK channel or if the UE does not receive ACK or NACK via the MSG-ACK channel for a corresponding access slot, the UE physical layer informs the UE MAC layer, via a PHY-DATA-CNF primitive [S209], that the MAC PDU including the first RLC PDU was not successfully transmitted.

Meanwhile, the UE may operate differently by distinguishing between a case where a NACK is received via the MSG-ACK channel and a case where no response of any kind is received via the MSG-ACK channel. Preferably if the UE receives NACK, the UE physical layer informs the MAC layer that NACK is received. The UE MAC layer then delays a transmission for a back-off time period corresponding to NACK and executes from step S212.

If the UE receives no response, the UE physical layer delays a transmission for a back-off time period and executes from the step S213. Alternatively, if the UE receives no response, the UE physical layer informs the MAC layer that a response is not received. The UE MAC layer then delays a transmission for a back-off time period and executes from the step S212.

The UE MAC layer informs the UE RLC layer that the first RLC PDU was not successfully transmitted via a MAC-STATUS-IND primitive and requests a retransmission [S210]. The UE RLC layer then delivers the first RLC PDU to the UE MAC layer via a MAC-DATA-REQ primitive [S211]. However, if the UE MAC layer stores the previously transmitted first RLC PDU, the UE does not perform the steps S210 and S211.

The UE MAC layer initiates the RACH process. In this process, the UE MAC layer performs the persistency test at least once for deciding whether to perform a transmission according to the probability set by the RRC layer. The UE MAC layer then instructs the UE physical layer to initiate the PRACH process after a predetermined duration via a PHY-ACCESS-REQ primitive [S212]. Alternatively, for the second RACH process and the RACH transmission thereafter, the UE MAC layer may instruct the physical layer to immediately initiate the PRACH transmission process via a PHY-ACCESS-REQ primitive without the persistency test or the predetermined back-off duration.

The UE physical layer initiates the PRACH transmission process. In doing so, the UE physical layer transmits a PRACH preamble [S213]. If the UE does not receive a response to the preamble for a predetermined time, the UE physical layer increases a transmission power by a predetermined level and transmits the preamble again.

If the Node B (base station) receives the preamble, the Node B physical layer transmits a response signal to the preamble via AICH [S214]. If the UE receives an ACK response for the preamble via the AICH, the UE physical layer informs the UE MAC layer of the ACK for the preamble via a PHY-ACCESS-CNF primitive [S215]. The UE MAC layer then delivers a MAC PDU including the first RLC PDU to the UE physical layer via a PHY-DATA-REQ primitive [S216]. Afterward, the UE transmits the MAC PDU including the first RLC PDU to the Node B via a PRACH message part [S217].

The Node B decides whether the MAC PDU including the first RLC PDU is correctly received by performing a cyclic redundancy check (CRC) of the received PRACH message and the like. If the MAC PDU including the first RLC PDU is received correctly, the Node B transmits ACK to the UE via a MSG-ACK channel [S218] to indicate that the PRACH message part was correctly received. If the MAC PDU including the first RLC PDU is received incorrectly, the Node B transmits NACK via the MSG-ACK channel or does not transmit any information for the corresponding access slot.

If the MAC PDU including the first RLC PDU is received correctly, the Node B delivers the successfully received MAC PDU including the first RLC PDU to the RNC via a RACH frame protocol (RACH FP) [S219]. The first RLC PDU included in the MAC PDU is then delivered to the RLC layer of the RNC.

Preferably, the UE physical layer informs the UE MAC layer, via a PHY-DATA-CNF primitive [S220], that the MAC PDU including the first RLC PDU was successfully transmitted. The UE MAC layer then informs the UE RLC layer, via a MAC-STATUS-IND primitive [S221] that the first RLC PDU was successfully transmitted.

Figure 11:
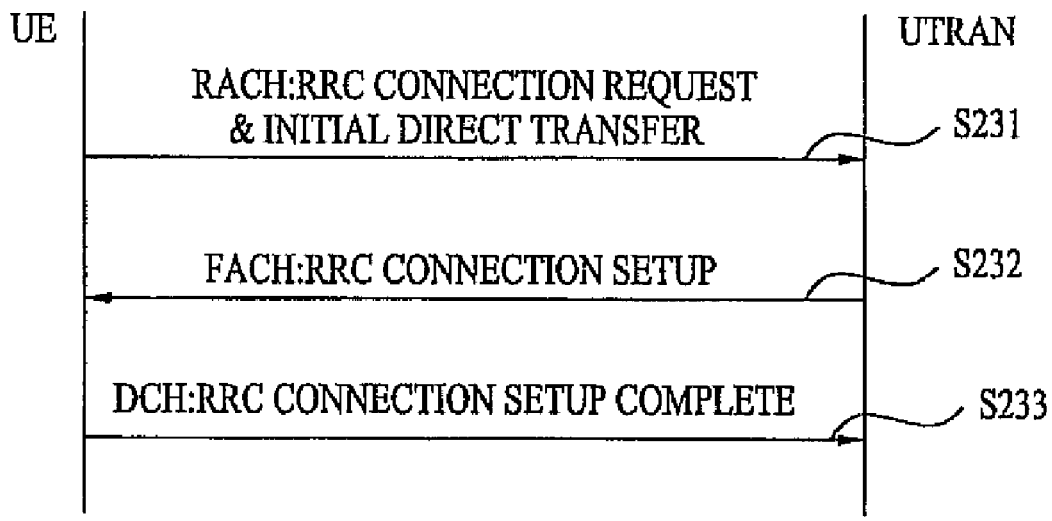
FIG. 11 is a flowchart illustrating a method for transmitting an RRC connection request message and a UE's initial direct transfer (IDT) message in accordance with one embodiment of the present invention.

FIG. 11 is a flowchart illustrating a method for transmitting an RRC connection request message and a UE's initial direct transfer (IDT) message in accordance with one embodiment of the present invention. Preferably, by using an RACH transmission according to the present invention, a UE can transmit an RRC connection request message to a UTRAN for requesting an RRC connection together with an IDT message for requesting a signaling connection. A message included in the IDT Message may be at least one of a location update request, a communication management (CM) service request, a routing area update request and a service request, for example.

Referring to FIG. 11, a UE transmits both an RRC connection request message and an IDT message to a UTRAN using the aforesaid RACH process [S231]. For example, the RRC connection request message may correspond to the first RRC message of the embodiment shown in FIG. 6 and the IDT message may correspond to the second RRC message of the embodiment shown in FIG. 6. Preferably, in order for the UTRAN to link the IDT message with the RRC connection request message, the IDT message is transmitted with the same initial UE identity the RRC connection request message is transmitted with (from provisional application).

The UTRAN having received the IDT message delivers an INITIAL UE message to a CN using the received IDT message. Afterward, the UTRAN transmits an RRC connection setup message to the UE in response to the RRC connection request message using a forward access channel (FACH) [S232]. The UE then sets up a dedicated channel (DCH) and transmits an RRC connection setup complete message to the UTRAN using the DCH [S233].

Figure 12:
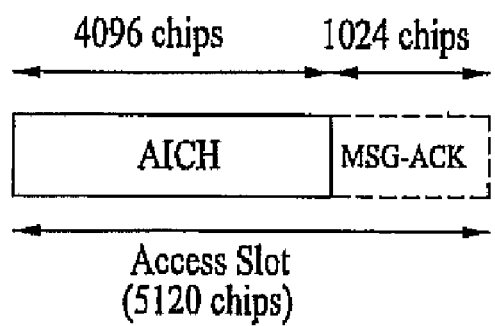
FIG. 12 is a diagram of an MSG-ACK channel in accordance with preferred embodiments of the present invention.

FIG. 12 is a diagram of an MSG-ACK channel in accordance with preferred embodiments of the present invention. Referring to FIG. 12, for one access slot, an MSG-ACK channel uses a 1,024-chip area and an AICH transmission uses a 4,096-chip area. Preferably, an AICH channel uses the same scrambling code and channel code of the MSG-ACK channel. Preferably, if an affirmative response ACK for one PRACH message is transmitted, the MSG-ACK is transmitted using a code and signature corresponding to a PRACH preamble of the PRACH message.

Figure 13:
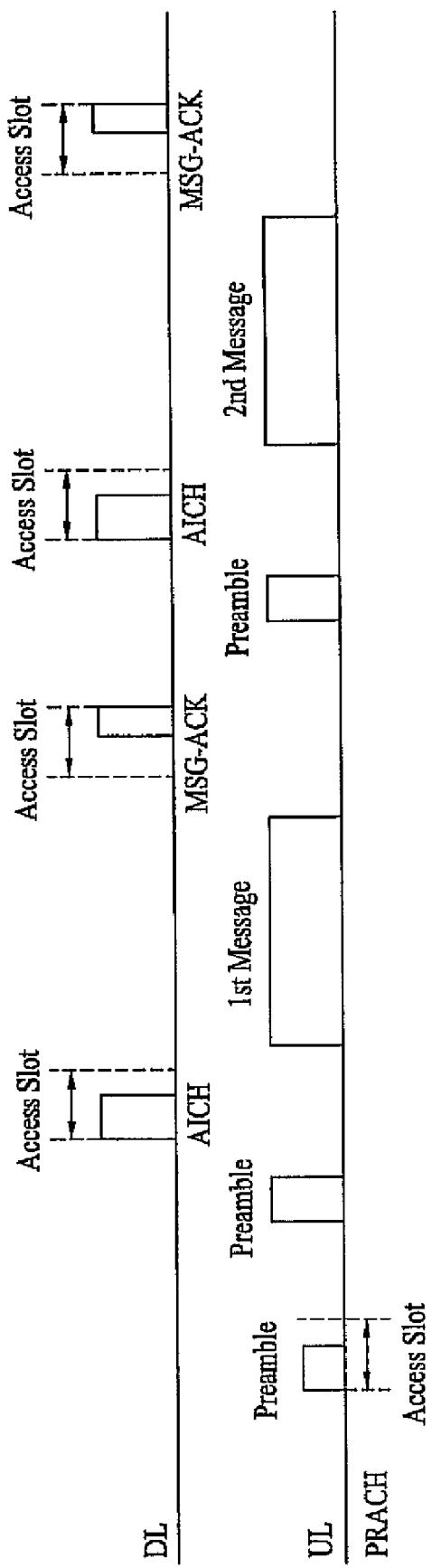
FIG. 13 is a diagram for illustrating a method for transmitting a physical channel PRACH in accordance with one embodiment of the present invention.

FIG. 13 is a diagram for illustrating a method for transmitting a physical channel PRACH in accordance with one embodiment of the present invention. Referring to FIG. 13, after transmitting one PRACH message, a UE waits for an ACK or NACK response transmitted via an MSG-ACK channel for an access slot corresponding to the PRACH transmission.

If the ACK is carried over an MSG-ACK channel, the UE transmits a preamble for a next PRACH message transmission. If an affirmative response is received via AICH, the UE transmits a next PRACH message. Here, if the next PRACH message is a last message and if ACK is received via the MSG-ACK channel for an access slot corresponding to the next PRACH message transmission, a physical layer of the UE terminates the PRACH transmission and informs a MAC layer of the UE of the ACK received via the MSG-ACK channel.

Meanwhile, if a NACK is received via the MSG-ACK channel for an access slot corresponding to the next PRACH message transmission or if nothing is received, the UE transmits the preamble again to retransmit the next PRACH message.

A retransmission process of one PRACH message is executed until an ACK is received from the MSG-ACK channel, or is repeated as many as a maximum message retransmission number transmitted to a MAC or physical layer from an RRC layer. The maximum message retransmission number may be included in the RACH configuration information in FIG. 8.

Figure 14:
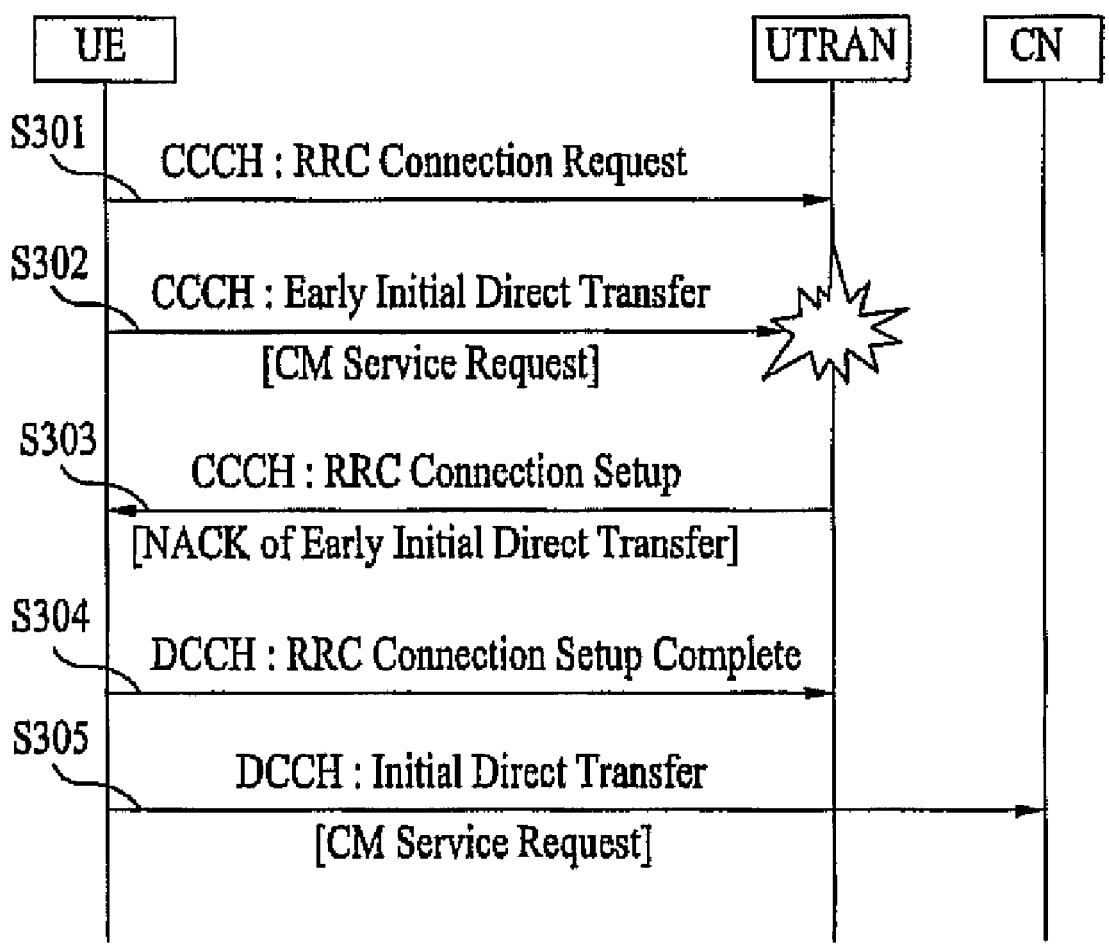
FIG. 14 is a flowchart illustrating a method for transmitting an RRC connection request message and a UE's initial direct transfer (IDT) message in accordance with another embodiment of the present invention.

FIG. 14 is a flowchart illustrating a method for transmitting an RRC connection request message and a UE's initial direct transfer (IDT) message in accordance with another embodiment of the present invention.

Referring to FIG. 14, a UE transmits, to a UTRAN, an RRC connection request message for requesting an RRC connection [S301] together with an early IDT message for requesting a signaling connection (CM service request, for example) [S302] using a common control channel (CCCH). Here, the RRC connection request message is correctly received by the UTRAN. Accordingly, the UTRAN will transmit an RRC connection setup message to the UE in response to the UE's RRC connection request message [S303] via the CCCH.

Preferably, the RRC connection setup message may be used by the UTRAN to indicate the correct or incorrect reception of the early IDT message. If the early IDT message is correctly received by the UTRAN, an ACK of the early IDT message is included in the RRC connection setup message transmitted to the UE. However, if the early IDT message is incorrectly received by the UTRAN, a NACK of the early IDT message is included in the RRC connection setup message transmitted to the UE [S302, S303].

Moreover, if the UE receives the NACK of the early IDT message, the UE immediately stops transmission of the early IDT and begins transmission of an RRC connection setup complete message using a dedicated control channel (DCCH) [S304]. Afterward, the UE transmits a normal IDT message to a core network (CN) using the DCCH [S305].

Notably, the UTRAN does not need to wait to receive the early IDT message after receiving the RRC connection request message. If the UTRAN does not receive the early IDT message on the CCCH before sending the RRC connection setup message, the UTRAN will indicate in the RRC connection setup message that the early IDT message was not received (NACK of early IDT message). Therefore, even if the UTRAN later receives the early IDT message on the CCCH after transmitting the RRC connection setup message, the UTRAN will ignore the later-received early IDT message.

In one aspect of the invention, if the RRC connection request message is unsuccessfully transmitted while the early IDT message is successfully transmitted to the UTRAN, the UE will re-transmit the RRC connection request message after a predetermined time. Preferably, the UE will transmit both the RRC connection request message and the early IDT message regardless of the previously successful transmission of the early IDT message. Thus, the UTRAN ignores any early IDT message received prior to successfully receiving the RRC connection request message.

In another aspect of the invention, if both the RRC connection request message and the early IDT message are unsuccessfully transmitted to the UTRAN, the UE will re-transmit both the RRC connection request message and the early IDT message after a predetermined time.

In a further aspect of the invention, if the UE performs cell re-selection after sending the RRC connection request message, the UE will re-transmit the RRC connection request message. This UE operation also applies when the UE performs cell re-selection after successfully transmitting the RRC connection request message and a subsequent early IDT message. Accordingly, if the UE performs cell re-selection after sending the RRC connection request message and the subsequent early IDT message, the UE will transmit the RRC connection request message and the early IDT message again because the UE does not know whether both messages were successfully transmitted or whether the re-selected cell is controlled by the same CRNC controlling a previously-selected cell. Furthermore, in case of cell re-selection, if the RNC of the UTRAN has already transferred to the CN an early IDT message received before cell re-selection, the UTRAN will delay transferring a first non-access stratum (NAS) message to the UE until the successful reception of an RRC connection setup complete message from the UE.

Accordingly, the present invention provides the following effects or advantages. First, a wireless user equipment (UE) transmits a preamble and a first message in uplink via a common channel and transmits a second message in uplink via the common channel according to a downlink response signal received from a network or retransmits the first message. Hence, the wireless UE can transmit a message having a long length with a proper transmission power via a common uplink channel. Second, in case that a UE transmits a message via an uplink common channel, a Node B can quickly respond to the message.

Figure 15:
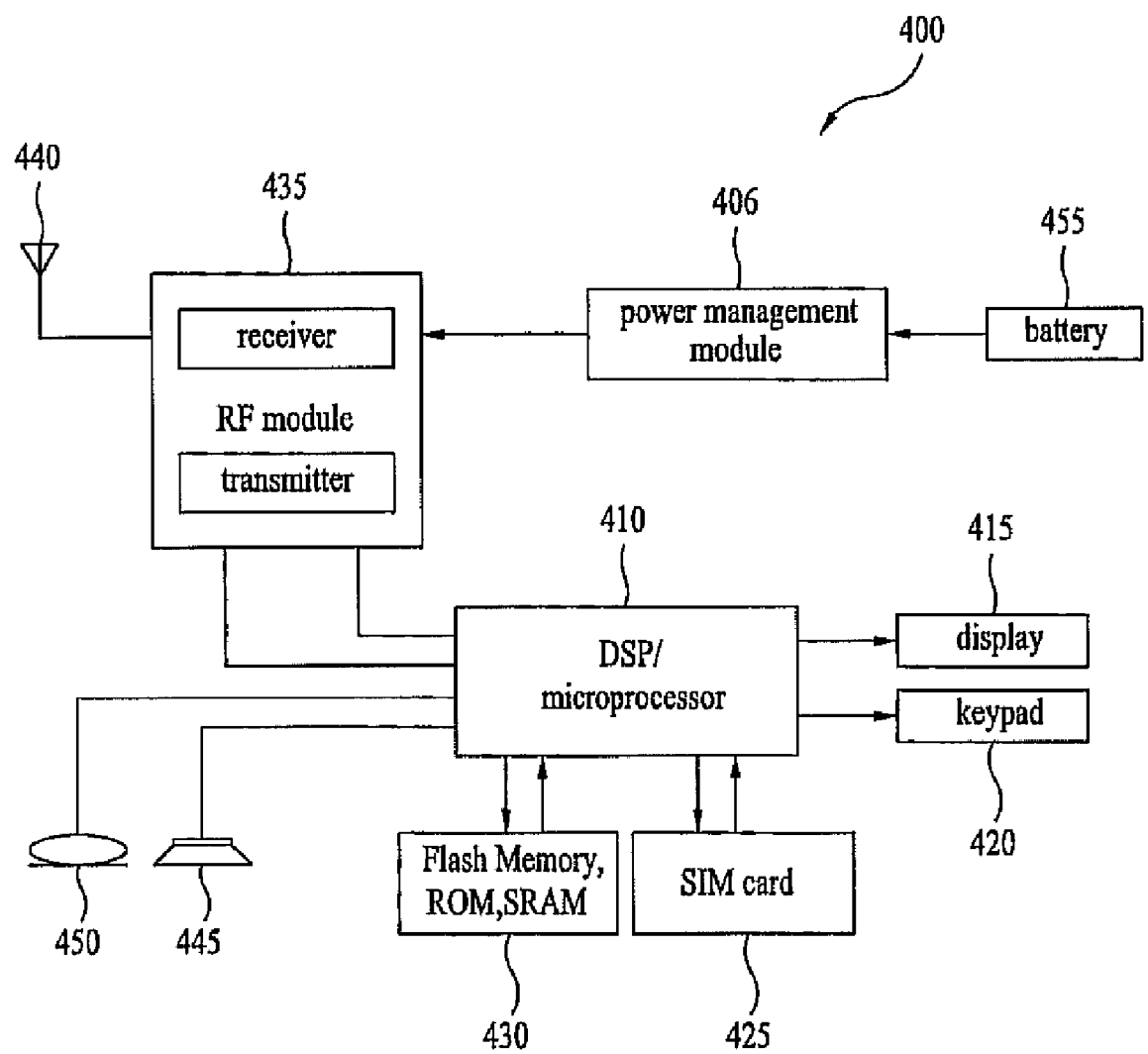
FIG. 15 illustrates a block diagram of a mobile communication device in accordance with preferred embodiments of the present invention.

Referring to FIG. 15, a block diagram of a mobile communication device 400 of the present invention is illustrated, for example a mobile phone for performing the methods of the present invention. The mobile communication device 400 includes a processing unit 410 such as a microprocessor or digital signal processor, an RF module 435, a power management module 406, an antenna 440, a battery 455, a display 415, a keypad 420, a storage unit 430 such as flash memory, ROM or SRAM, a speaker 445 and a microphone 450.

A user enters instructional information, such as a telephone number, for example, by pushing the buttons of a keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF module 435 to initiate communication, for example, transmits radio signals comprising voice communication data. The RF module 435 comprises a receiver and a transmitter to receive and transmit radio signals. The antenna 440 facilitates the transmission and reception of radio signals. Upon receiving radio signals, the RF module 435 may forward and convert the signals to baseband frequency for processing by the processing unit 410. The processed signals would be transformed into audible or readable information outputted via the speaker 445, for example.

The processing unit 410 is adapted to receive first and second data from an upper layer and generate a first and second data block comprising information related to the first and second data to be transmitted to a network. The processing unit 410 is also adapted to control a transmitter of the RF module 435 to transmit the first and second data block to the network. A receiver of the RF module 435 is adapted to receive signals from the network.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting messages from a mobile terminal to a network using a random access procedure in a mobile communication system, the method comprising:

transmitting a first preamble for random access to the network on a physical random access channel (PRACH);

determining whether an acknowledgement in response to the preamble for random access is received from the network on an acquisition indicator channel (AICH);

transmitting a second preamble for random access to the network on a PRACH if the acknowledgement in response to the preamble is not received;

transmitting a first message to the network after receiving a first PHY-DATA-REQ primitive from a medium access control (MAC) layer of the mobile terminal at a physical (PHY) layer of the mobile terminal if the acknowledgement in response to the first or second preamble was received;

receiving either an acknowledgement (ACK) or non-acknowledgement (NACK) from the network the in response to the first message;

performing a retransmission of the first message if the NACK is received in response to the first message; and transmitting a second message to the network after receiving a second PHY-DATA-REQ primitive from the medium access control (MAC) layer of the mobile terminal at the physical (PHY) layer of the mobile terminal if the ACK is received in response to the first message and the mobile terminal has data to be transmitted to the network, wherein each of the first and second messages comprises data delivered from an upper layer of the physical (PHY) layer.

2. The method of claim 1, wherein the first and second messages are radio resource control (RRC) messages.

3. The method of claim 1, wherein the first and second messages are radio link control (RLC) messages.

4. The method of claim 1, wherein the first message is a radio resource control (RRC) connection request message and the second message is an initial direct transfer (IDT) message.

5. The method of claim 1, further comprising transferring a CMAC-STATUS-IND primitive from the medium access control (MAC) layer to the radio resource control (RRC) layer of the mobile terminal.

6. A mobile terminal for transmitting messages to a network using a random access procedure in a mobile communication system, wherein the mobile terminal is configured to:
- transmit a first preamble for random access on a physical random access channel (PRACH) to the network;
- determine whether an acknowledgement in response to the preamble for random access is received from the network on an acquisition indicator channel (AICH);
- transmit a second preamble for random access to the network on a physical random access channel (PRACH) if the acknowledgement in response to the first preamble is not received;
- transmit a first message to the network after receiving a first PHY-DATA-REQ primitive from a medium access control (MAC) layer of the mobile terminal at a physical (PHY) layer of the mobile terminal if the acknowledgement in response to the first or second preamble was received;
- receive either an acknowledgement (ACK) or non-acknowledgement (NACK) from the network in response to the first message;
- perform a retransmission of the first message if the NACK is received in response to the first message; and
- transmit a second message to the network after receiving a second PHY-DATA-REQ primitive from the medium access control (MAC) layer of the mobile terminal at the physical (PHY) layer of the mobile terminal if the ACK is received in response to the first message and the mobile terminal has data to be transmitted to the network,
- wherein each of the first and second messages comprises data delivered from an upper layer of the physical (PHY) layer.

7. The mobile terminal of claim 6, wherein the mobile terminal is further configured to transfer a CMAC-STATUS-IND primitive from the medium access control (MAC) layer to the radio resource control (RRC) layer of the mobile terminal.

* * * * *